United States Patent [19]

Ho

[11] Patent Number: 6,072,769
[45] Date of Patent: Jun. 6, 2000

[54] METHOD FOR MULTITONE DIVISION MULTIPLE ACCESS COMMUNICATIONS

[75] Inventor: Jin-Meng Ho, Lake Hiawatha, N.J.

[73] Assignee: AT&T Corporation, New York, N.Y.

[21] Appl. No.: 08/808,782

[22] Filed: Mar. 4, 1997

[51] Int. Cl.[7] .................................................. H04J 13/00
[52] U.S. Cl. ..................... 370/204; 370/210; 370/436; 370/478; 370/525
[58] Field of Search .................................... 370/320, 319, 370/335, 341, 441, 479, 480, 525, 241, 204, 210, 436, 478; 375/260, 222

[56] References Cited

U.S. PATENT DOCUMENTS

| | | | |
|---|---|---|---|
| 5,023,889 | 6/1991 | Divsalar et al. | |
| 5,315,584 | 5/1994 | Savary et al. | |
| 5,410,538 | 4/1995 | Roche et al. | |
| 5,610,908 | 3/1997 | Shelswell et al. | 370/210 |
| 5,838,799 | 11/1998 | Cioffi et al. | 370/524 |
| 5,875,208 | 2/1999 | Hoole | 375/200 |
| 5,896,425 | 4/1999 | Hirano et al. | 375/354 |
| 5,914,933 | 6/1999 | Cimini et al. | 370/208 |

FOREIGN PATENT DOCUMENTS 0 430 587 A2   6/1991   European Pat. Off. .

WO 96/31960   10/1996   WIPO .

OTHER PUBLICATIONS

"Analysis and Simulation of a Digital Mobile Channel Using Orthogonal Frequency Division Multiplexing", Author: Leonard J. Cimini, Jr., IEEE Transactions on Communications, vol. Com.–33, No. 7, Jul. 1985, pp. 665–675.

*Primary Examiner*—Hassan Kizou
*Assistant Examiner*—Ahmed Elallam
*Attorney, Agent, or Firm*—Banner & Witcoff, Ltd.

[57] ABSTRACT

A method for multiple users accessing a common channel in which coded application bits are generated and transmitted for a plurality of applications for a plurality of users. A plurality of tones are assigned to the coded application bits for each application. The coded application bits for each application are encoded into multitone symbols at a transmitter using the plurality of tones assigned to the coded application bits. The multitone symbols for each application are synchronized for transmission on a common uplink channel. At a receiver, the multitone symbols for each application are received from the common channel and tone decoded into the coded application bits for each application using the plurality of tones assigned to the coded application bits. The coded application bits are then decoded for each application.

8 Claims, 4 Drawing Sheets

METHOD FOR MULTITONE DIVISION MULTIPLE ACCESS COMMUNICATIONS

CROSS-REFERENCE TO RELATED APPLICATIONS

The present application is related to U.S. patent application Ser. No. 08/808,776 entitled "Differential PSK Signalling In CDMA Networks", filed Mar. 4, 1997, and commonly assigned; U.S. patent application Ser. No. 08,808,777 entitled "Method and System Providing Unified DPSK-PSK Signalling For CDMA-Based Satellite Communications", filed Mar. 4, 1997, and commonly assigned; and U.S. patent application Ser. No. 8/810,557 entitled "An FFT-Based Multitone DPSK Modem", filed Mar. 4, 1997, all commonly assigned, and each of which are incorporated by reference herein.

BACKGROUND OF THE INVENTION

1. Field of the Invention

The present invention relates to the field of telecommunications. More particularly, the present invention relates to a method for multi-user telecommunications.

2. Description of the Related Art

Currently, there are three major non-random multiple access techniques for multi-user communications: FDMA, TDMA and CDMA. In multimedia transmissions, i.e., applications having different data rates, none of these three multiple access techniques is effective in terms of throughput efficiency, hardware implementation, or signal quality. For instance, to accommodate a high bit rate data type, an FDMA approach assigns several frequency subbands that are separated by frequency guardbands and are realized by distinct carriers, resulting in spectral and hardware inefficiency. Similarly, a TDMA approach uses several time slots that are separated by time guardbands and requires accurate timing at both the transmitter and receiver. TDMA leads to throughput loss and intersymbol interference caused by channel distortion, multipath spread, and mistiming. Lastly, a CDMA approach breakdowns the high-rate bit stream to several lower-rate bit streams for achieving a sufficiently large processing gain. Each low-rate stream requires spreading and despreading processing. The breakdown to several low-rate streams is also necessary if dynamic assignment of any data types to a CDMA channel is to be achieved. Further, the performance of a CDMA rake receiver degrades considerably in the presence of intersymbol interference.

What is needed is an effective and efficient multiple access technique for multi-user communications that is resistant to intersymbol interference occurring in high-speed transmission, and accommodates multiple user data rates, while keeping hardware implementation simple.

SUMMARY OF THE INVENTION

The present invention provides a multiple access technique for multi-user communications that is resistant to intersymbol interference occurring in high-speed transmission, accommodates multiple user data rates without incurring a throughput loss, and keeps hardware implementation simple. In that regard, the present invention provides a new effective and efficient multiple access method for multi-user communications that allows transmission of multiple user data rates over a common channel, and has a throughout efficiency and implementation complexity comparable to those for systems providing single user data rates. Intersymbol interference arising from channel impairments, such as channel distortion and multipath propagation, as well as from transmitter and receiver baseband filtering, is avoided without using channel equalization. For wireless applications having space diversity reception, frequency selective fading is also alleviated. The present invention avoids inter-user interference for both point-to-multipoint and multipoint-to-point communications, while greatly relaxing the timing accuracy requirement at a receiver when compared to other multiple access techniques such as CDMA and TDMA.

The advantages of the present invention are provided by a method for multiple users accessing a common channel. Coded application bits are generated for a plurality of applications for a plurality of users. A plurality of tones, which are preferably a subset of available tones, are assigned to the coded application bits for each application. The coded application bits for each application are encoded into multitone symbols at a transmitter using the plurality of tones assigned to the coded application bits. The multitone symbols for each application are synchronized for transmission on a common channel. At a receiver, the multitone symbols for each application are received from the common channel and tone decoded into the coded application bits for each application using the plurality of tones assigned to the coded application bits. The coded application bits are then decoded for each application.

BRIEF DESCRIPTION OF THE DRAWING

The present invention is illustrated by way of example and not limitation in the accompanying figures in which like reference numerals indicate similar elements and in which.

DETAILED DESCRIPTION

The present invention provides a multiple access method for multi-user communications. The approach of the present invention, referred to as Multitone Division Multiple Access (MDMA), is effective for transmitting multiple data types of different rates, in resisting intersymbol interference, and in maximizing channel throughput. For single or multiple data rate transmissions, the approach of the present invention does not increase system hardware complexity, nor decrease channel throughput in comparison to FDMA, TDMA, and CDMA approaches. MDMA is resistant to intersymbol interference without using channel equalization, as is required by FDMA, TDMA and CDMA approaches. Furthermore, in realizing inter-user interference free communications for multipoint-to-point links, such as an uplink in a satellite or cellular system, the present invention imposes no stringent transmitter and receiver timing accuracy, as is the case for TDMA and CDMA approaches.

The present invention uses multitone modulation and assigns different application data to different tones. The multitone modulation technique not only serves as a modulation scheme, but also provides a multiple access mechanism. In particular, coded bits for various applications which are originated from, or destined to, a plurality of users are mapped over distinct sets of tones that are assigned to the respective applications at the time the calls are initialized. The bits are encoded into symbols (tones) for discrete multitone modulation, and the reverse demodulation process is performed for recovering received tones and the information bits. Unassigned symbols are set to zero.

For downlink (point-to-multipoint) transmission, a user's receiver selects the tones assigned for the applications intended for the user after discrete multitone demodulation so that only the information bits belonging to that user are decoded. For uplink (multipoint-to-point) transmission, the transmission is synchronized among all the users associated with a particular receiver. The demodulated symbols are aligned with associated applications and users so that the decoded bits can be identified properly for further processing. The synchronization accuracy may be greatly relaxed by appropriately designing the multitone modem.

Figure 1:
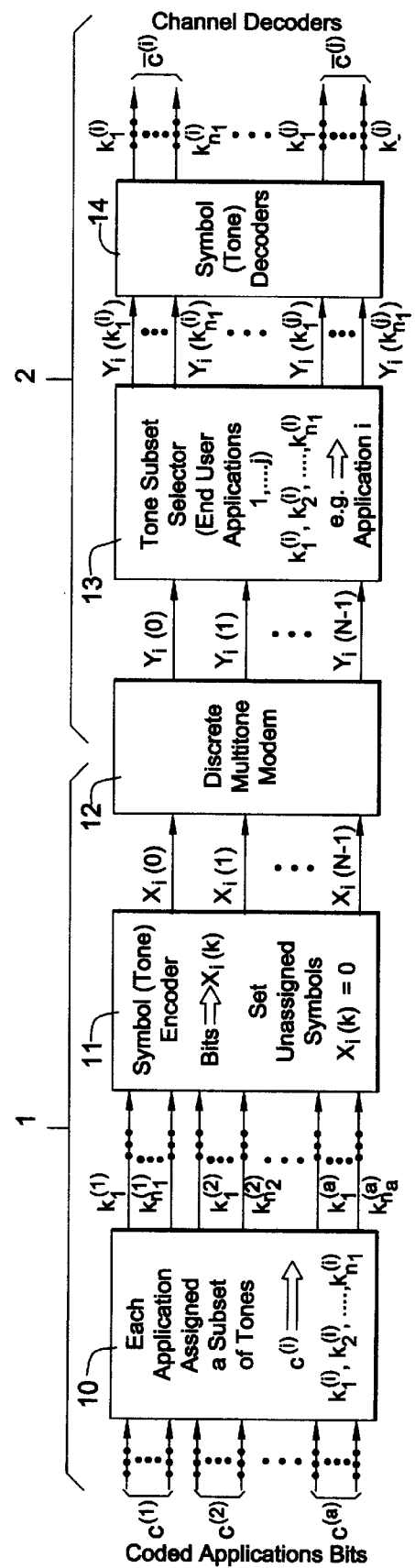
FIG. 1 shows a block diagram of the basic functional elements for a transmitter and a receiver for a downlink (point-to-multipoint) according to the present invention.

FIG. 1 shows a block diagram of the basic functional elements for a transmitter 1 and a receiver 2 for an MDMA downlink (point-to-multipoint). Multiple data streams $c^{(1)}$ through $c^{(a)}$ representing different applications and different users are assigned to distinct subsets of the tones at 10. A subset of tones may comprise the entire set of available tones, and is established during the setup process for a call. With this pre-assignment of tones, encoding of the channel coded data bits into multitone symbols proceeds at 11. Symbols that are not associated with any applications are set to zero.

Figure 2:
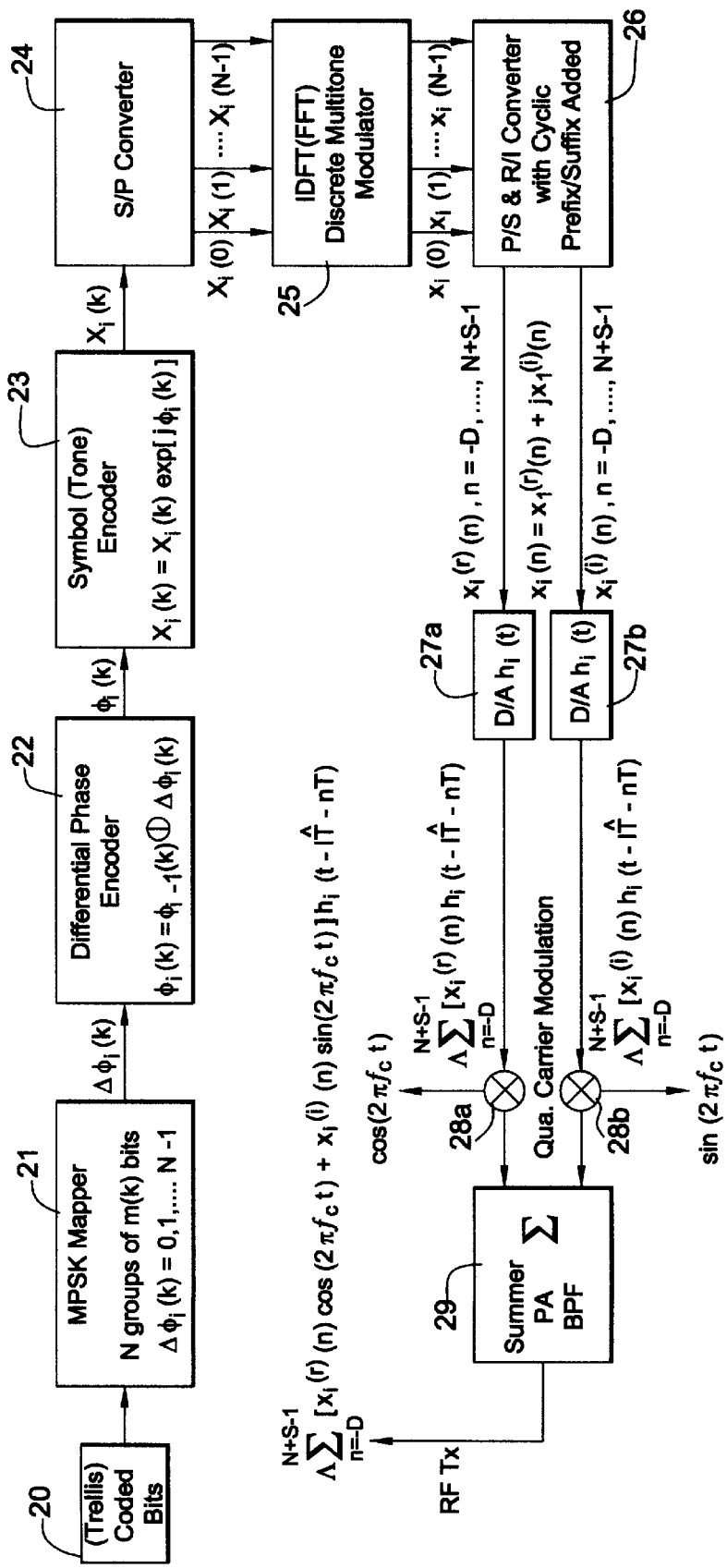
FIG. 2 shows a block diagram of the basic functional elements of an FFT-based multitone DPSK modem configured as a transmitter according to the present invention.
Figure 3:
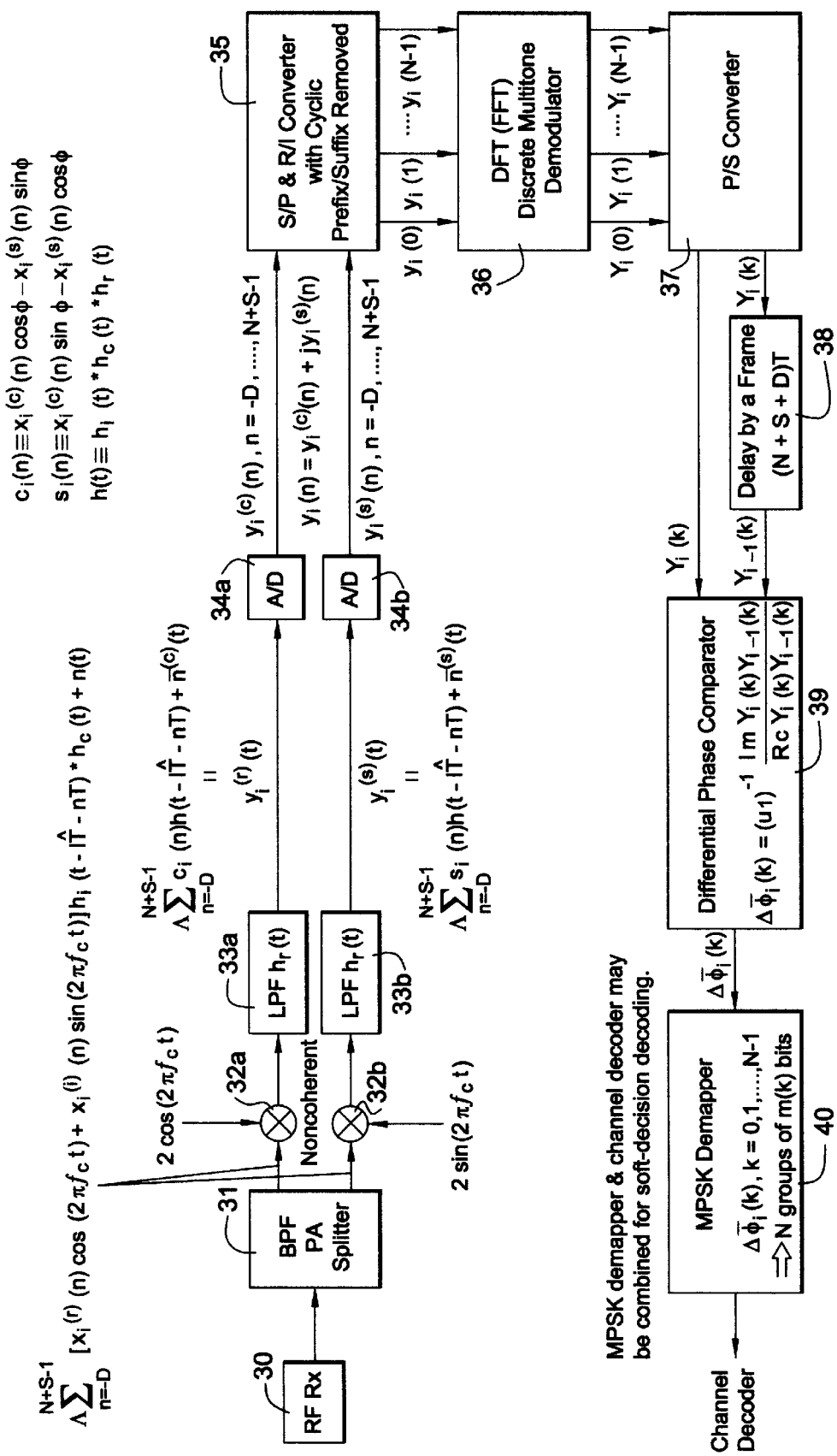
FIG. 3 shows a block diagram of the basic functional elements of an FFT-based multitone DPSK modem configured as a receiver according to the present invention.

The encoded tones for the multiple data streams are then processed by block 12, which represents modulation and transmission of the multiple data streams by transmitter 1, and reception and demodulation of the data streams at receiver 2. FIGS. 2 and 3 show functional details of an FFT-based multitone DPSK modem system that is suitable for block 12. Following multitone demodulation at receiver 2, the recovered symbols are selected for symbol and channel decoding, if and only if, the symbols are associated with applications for receiver 2. The symbols are properly identified with an application and decoded.

FIG. 2 shows a block diagram of the basic functional elements of an FFT-based multitone DPSK modem according to the invention that is configured as a transmitter for a single bit stream. In FIG. 2, a sequence of (trellis) coded information bits 20 are input to an MPSK mapper 21. MPSK mapper 21 maps groups of data bits onto MPSK constellation points. In particular, the coded information bits are segmented into frames of M bits. (In this case, the size of constellation (M) and the number of bits (M) per frame coincidently use the same symbol M. For purposes of the present invention, the size of constellation M can be different from the number of bits M per frame.) Each frame of M bits is then parsed into N groups, where the k-th group is assigned m(k) bits, and M=m(0)+m(1)+ . . . +m(N−1). Each group is separately mapped into a differential phase $\Delta\phi_1(k)$, where k=0, 1, . . . , N−1, according to the chosen PSK constellation.

A differential phase encoder 22 operates on two consecutive frames, i.e., a current frame and a preceding frame, to generate an absolute phase $\phi_1(k)$ for each group in the current frame. The absolute phase $\phi_1(k)$ is then used by a symbol (tone) encoder 23 for generating a complex symbol $X_1(k)$, or a discrete tone, on the complex signal plane. A complex symbol $X_1(k)$ equals $\overline{X}_1(k)\exp[j\phi_1(k)]$. The amplitude of $X_1(k)$ is chosen for maximizing the overall channel capacity or for achieving desired signal-to-noise ratios across the tones. Next, N complex symbols within each frame pass through a serial-to-parallel (S/P) converter 24 and are applied to the input of an inverse discrete Fourier transform (IDFT) discrete multitone modulator 25. The N complex symbols within each frame are inverse discrete Fourier transformed into N complex samples in the time domain via an FFT.

The N parallel samples in each frame are converted back to a serial sequence by a parallel-to-serial (P/S) converter 26, which also adds a cyclic prefix and suffix to each frame and further converts the enlarged complex sample sequence into two real data sequences by separating each complex sample into a real part and an imaginary part (R/I). The length of the cyclic suffix is one or two samples, while the length of the cyclic prefix is the length of the cyclic suffix plus the unit-sample response of the overall digital channel including the transmitting and receiving filters as well as the transport medium between the transmitting and receiving filters. The one or two samples added for both prefix and suffix allows for a large timing offset in synchronization and sampling at the receive r, while the other samples appended to the prefix enables interframe-free interference, and thus intersymbol-free interference, over a time dispersive channel.

The two real sequences a re then passed through two identical lowpass filters 27a and 27b for digital-to-analog (D/A) conversion. Two baseband signals are thus generated, and subsequently they modulate two quadrature carriers at mixers 28a and 28b. After quadrature multiplexing, appropriate power amplification a nd bandpass filtering at 29, successive (extended) frames are transmitted. The modem of FIG. 2 processes multiple bit streams that have each been associated with distinct tone sets in a similar fashion.

FIG. 3 shows a block diagram of the basic functional elements of an FFT-based multitone DPSK modem configured as a receiver according to the present invention. A received RF signal 30 is bandpass filtered, power amplified, and split into two components at 31 for non-coherent quadrature demodulation (i.e., frequency down-conversion) at mixers 32a and 32b and lowpass filters 33a and 33b. The resulting quadrature baseband components are sampled in parallel by analog-to-digital (A/D) converters 34a and 34b. The output of A/D converters 34a and 34b are input to an S/P & R/I converter 35, where the two real sample sequences are converted to a complex sample sequence by treating each pair of the real samples as the real part and the imaginary part (R/I) of a complex sample. The samples at the two ends of the extended frame that are associated with the added prefix and suffix are discarded here, and the resulting N complex samples within each frame are further organized into a parallel format by a serial-to-parallel (S/P) converter.

The N parallel complex numbers within each frame are then discrete Fourier transformed via an FFT by discrete multitone demodulator 36 to yield N complex symbols. The N complex symbols are the transmitted tones weighted by the exponential of the difference of the locally generated and received carrier phases and the frequency response of the overall channel at the corresponding tones, and further corrupted by noise. The N complex symbols pass through a parallel-to-serial (P/S) converter 37, having a serial output that is sent to a frame delay device 38 and a differential phase comparator 39. The output of frame delay device 38 is the input delayed by one frame. Differential phases between the corresponding symbols of two consecutive frames, i.e., the current frame and the preceding frame, are evaluated by differential phase comparator 39 in a wellknown manner without having to determine the received carrier phase or the channel frequency response. The extracted differential phase values are mapped back to coded bits by an MPSK demapper 40 for subsequent channel decoding (not shown). Alternatively, the MPSK demapper and the channel decoder, such as a Viterbi decoder, may be combined for soft-decision decoding.

Figure 4:
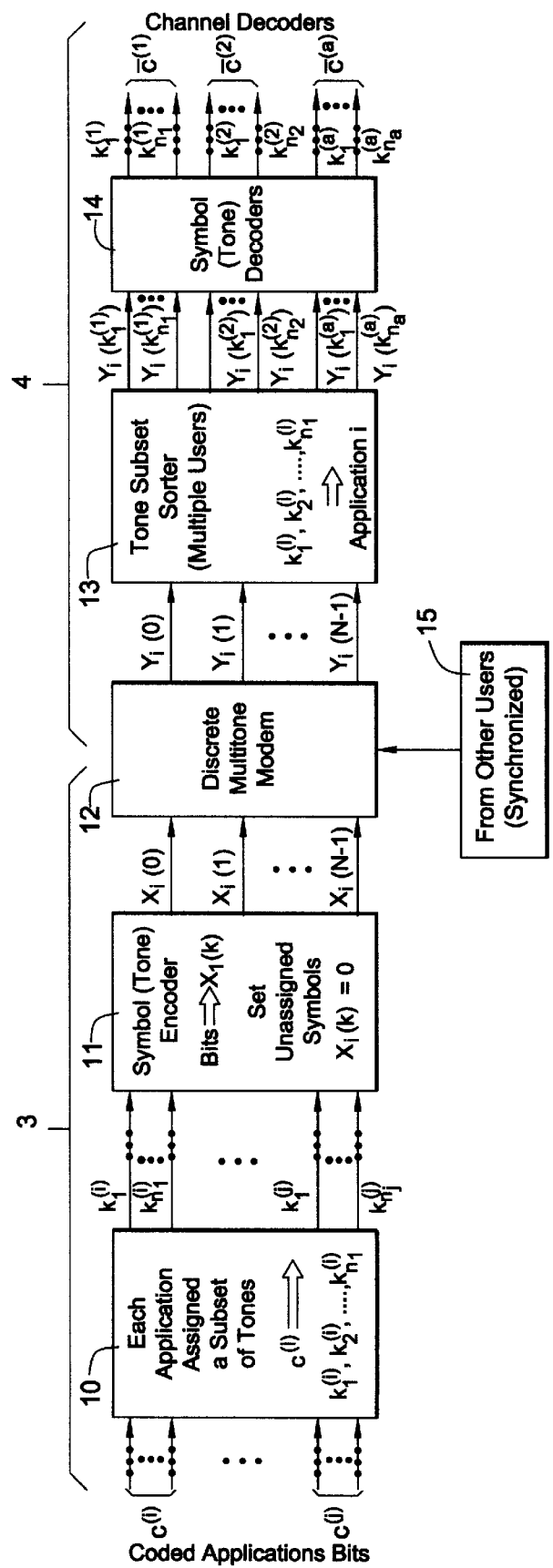
FIG. 4 shows a block diagram of the basic functional elements for a transmitter and a receiver for an uplink (multipoint-to-point) according to the present invention.

FIG. 4 shows a block diagram of the basic functional elements for a transmitter 3 and a receiver 4 for an MDMA uplink (multipoint-to-point). The architecture for an uplink is similar to that for the downlink (FIG. 1). In particular, each application accessing the uplink is assigned a distinct set of multitone symbols so that messages generated by each application are distinguishable from messages generated by other applications. The unused symbols are again set to zero. All transmissions are frame synchronized with respect to the receiver for avoiding interuser interference when more than one other user 15 accesses the channel. Synchronization errors of one or even two sample intervals will not cause substantial transmission errors to the present invention where one or two cyclic samples are added to the prefix and suffix of the multitone modulated sample sequences for each frame prior to transmission, as previously mentioned. All the recovered symbols at the receiver after multitone demodulation are identified with the respective applications and users, followed by symbol and channel decoding.

While the present invention has been described in connection with the illustrated embodiments, it will be appreciated and understood that modifications may be made without departing from the true spirit and scope of the invention.

What is claimed is:

1. A method for multiple users to communicate using a common communications channel, comprising the steps of:

generating coded application bits for a plurality of applications;

assigning a plurality of tones to the coded application bits for each application;

encoding the coded application bits for each application into multitone symbols at a transmitter using the plurality of tones assigned to the respective coded application bits;

transforming the multitone symbols into complex time-domain samples using an inverse discrete Fourier transform; and transmitting the complex time-domain samples transformed from the multitone symbols for each application on a common channel using a discrete multitone modem.

2. The method according to claim 1, wherein the plurality of tones assigned to the coded bits of an application is a subset of available tones.

3. The method according to claim 1, wherein the step of generating coded application bits is done for a plurality of users; and the step of transmitting the complex time-domain samples on the common channel includes the step of synchronizing transmissions among the plurality of users with respect to a destination receiver.

4. The method according to claim 3, wherein the common channel is a multipoint-to-point uplink channel.

5. The method according to claim 1, further comprising the steps of:

receiving the complex time-domain samples for each application from the common channel using the discrete multitone modem;

transforming the complex time-domain samples to multitone symbols using a discrete Fourier transform;

decoding the multitone symbols for each application into coded application bits for each application at a receiver using the plurality of tones assigned to the coded application bits; and decoding the coded application bits for each application.

6. The method according to claim 5, wherein the step of generating decoded application bits is done for a plurality of users.

7. A method for multiple users to receive communications using a common communication channel, comprising the steps of:

receiving complex time-domain samples transformed from multitone symbols for each of a plurality of applications from a common channel using a discrete multitone modem at a receiver, the multitone symbols for each application being a plurality of coded application bits encoded using a plurality of tones assigned to each plurality of coded application bits;

transforming the complex time-domain samples to multitone symbols using a discrete Fourier transform;

decoding the multitone symbols for each application into coded application bits for each application at the receiver using the plurality of tones assigned to the coded application bits; and decoding the coded application bits for each application.

8. The method according to claim 7, wherein the step of generating decoded application bits is done for a plurality of users.

* * * * *